United States Patent [19]

Bryan

[11] 4,077,532
[45] Mar. 7, 1978

[54] AIRBORNE CARGO CONTAINER TRANSPORTER AND TRANSFER SYSTEM

[75] Inventor: Darold Ray Bryan, Seattle, Wash.

[73] Assignee: The Boeing Company, Seattle, Wash.

[21] Appl. No.: 801,545

[22] Filed: May 31, 1977

[51] Int. Cl.² .............................................. B65G 67/02
[52] U.S. Cl. .................................. 214/310; 108/55.3; 108/56.3; 214/38 BA; 214/38 CC; 214/84; 214/512; 214/515
[58] Field of Search .................... 214/38 BA, 84, 310, 214/512, 515; 108/51.1, 55.3, 56.3; 244/137 R

[56] References Cited
U.S. PATENT DOCUMENTS

| 3,690,485 | 9/1972 | Fischer et al. ........................ 214/310 |
| 3,964,623 | 6/1976 | Verhein et al. ....................... 214/310 |

Primary Examiner—Robert G. Sheridan

Attorney, Agent, or Firm—Christensen, O'Connor, Johnson & Kindness

[57] ABSTRACT

A system for transporting and handling airborne cargo containers is disclosed. The system utilizes a low profile vehicle having mounted thereon a motorized height-adjustable roller bed capable of side loading cargo containers, having a stand which can be mounted on the roller bed and which has legs that reach the ground when the bed is lowered and having a slave support pallet which attaches to the bottom of a typical light weight airborne cargo container to give it the necessary structural rigidity and strength to be handled by surface borne cargo handlers, for example, a forklift. The slave pallet is adapted to be mounted on the stand and has a lattice grid which allows the rollers of the motorized roller bed to protrude therethrough and engage the bottom of the airborne cargo container, enabling the transfer of the container from and to the slave pallet stand and transporter vehicle combination.

13 Claims, 9 Drawing Figures

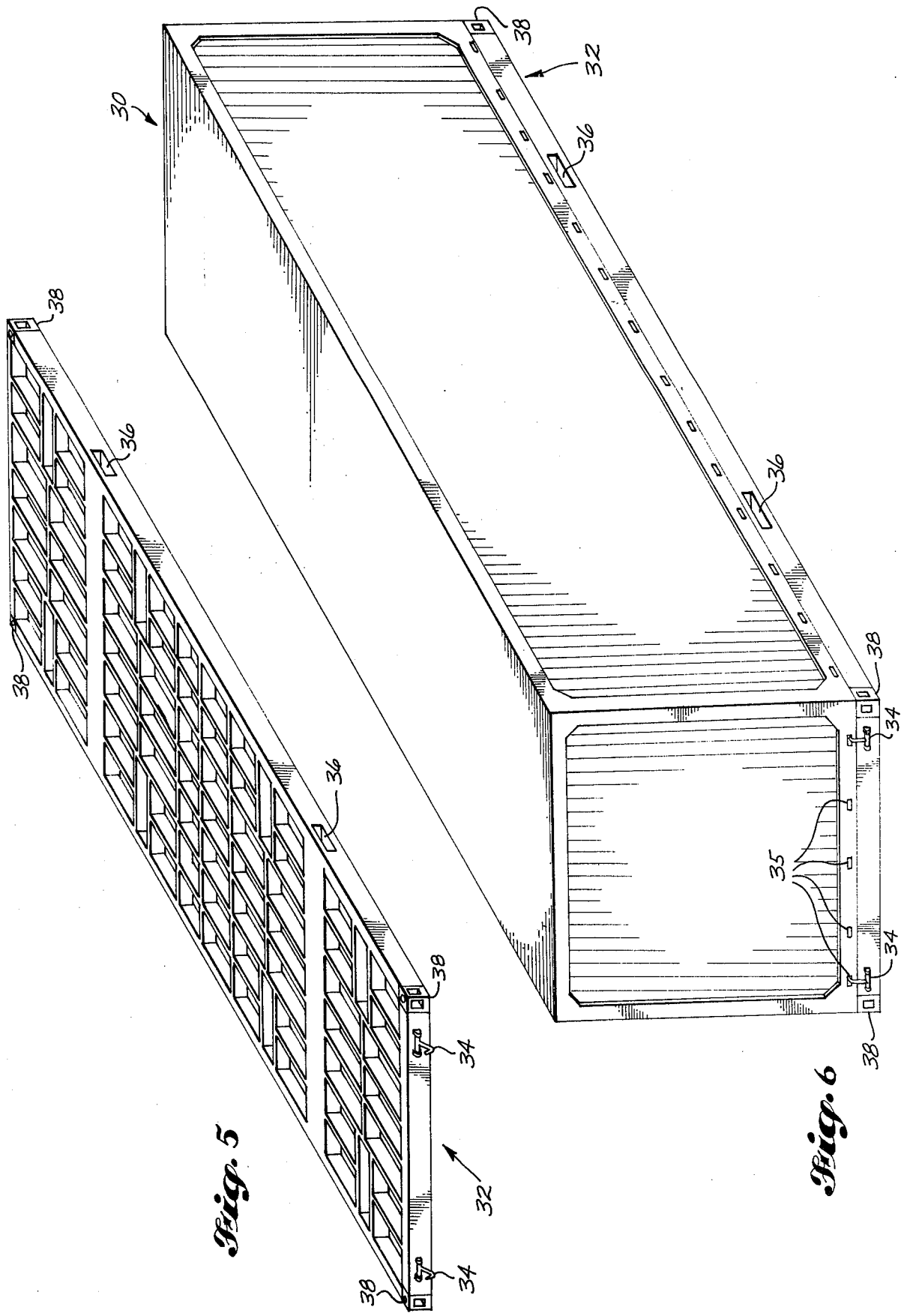

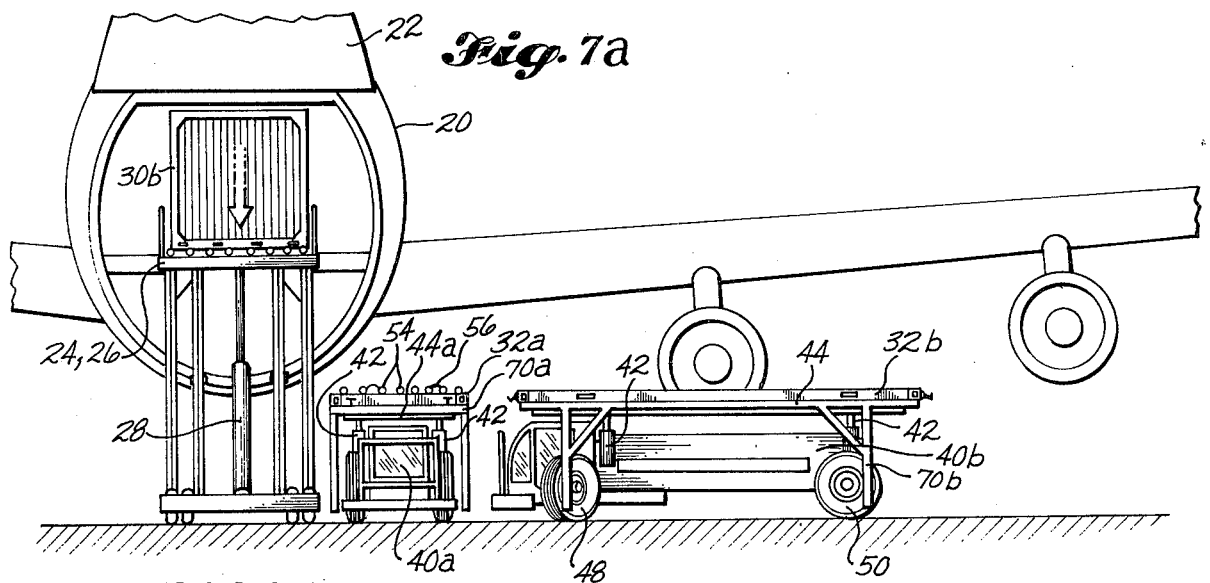
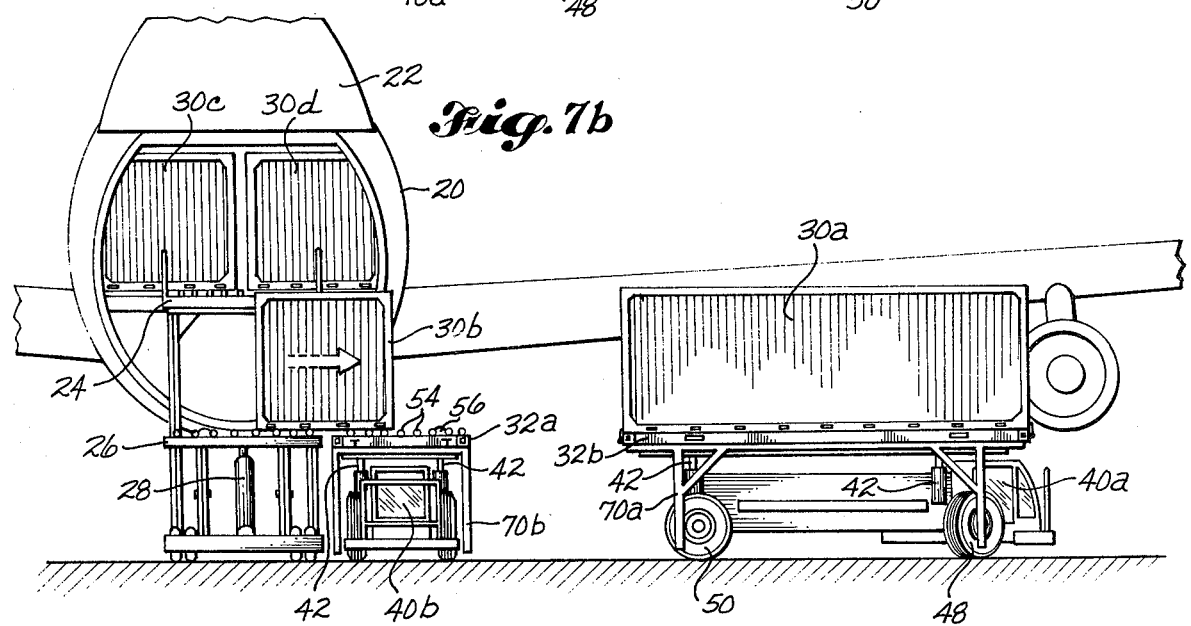
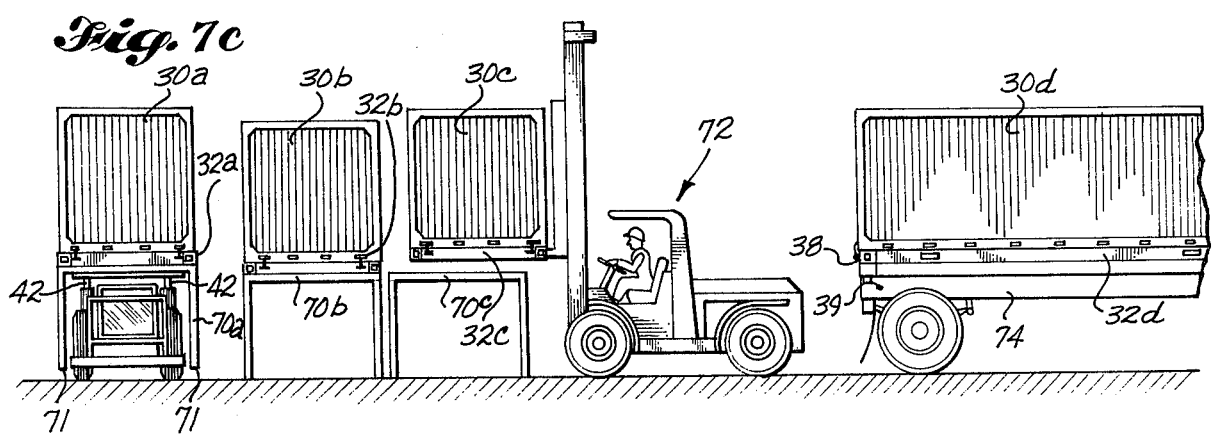

AIRBORNE CARGO CONTAINER TRANSPORTER AND TRANSFER SYSTEM

BACKGROUND OF THE INVENTION

This invention relates to airborne cargo container transfer systems, and more specifically to transfer systems for loading and unloading cargo from an aircraft in which the cargo is contained within lightweight, non-structural containers, the system providing the necessary support and handling capability to prevent damage to the containers. The handling means includes support means for conveniently storing the containers while on the ground.

An airborne cargo container is inherently of very lightweight construction and is relatively non-rigid structurally which makes it subject to possible damage during rigorous handling by conventional cargo handling equipment of the trucking industry and railroads. More specifically, the airborne cargo container has a relatively flexible bottom which enjoys multiple support contact points or areas during aircraft loading and unloading operation and in the aircraft cargo floor tie-down area. Therefore, if this air cargo container is also to be used as a road vehicle shipping container it must receive the same type of multiple contact area support which it receives in the aircraft cargo hold and in aircraft type cargo handlers. Also, while most surface-borne cargo handlers rely on the inherent rigidity of the surface-borne cargo container to support itself during handling by conventional equipment such as forklifts and cranes, the essentially non-rigid structure of a typical lightweight airborne cargo container requires that some external support device be provided to enable the container to be handled by conventional surface borne cargo handling equipment.

Many of the prior art methods of providing this support have been by means of a slave pallet which is attached to the bottom of the airborne cargo container. The prior art slave pallets have generally included a roller means mounted within each pallet to enable the pallet to be used with aircraft-type cargo handling systems. The addition of roller means to the slave pallet is undesirable since it adds both to the cost and weight of the pallet, making it more difficult to handle.

It is accordingly an object of this invention to provide a cargo container handling and storage apparatus which is of a lightweight and simple construction and which permits storage of containers on any level surface.

It is a further object of this invention to provide a cargo container handling system including a sufficient container support surface to prevent damage to the container and including a transporter means for moving the container and its support system from a storage area to an active loading area.

It is an additional object of this invention to provide transporter means cooperative with cargo container support means in which a simple pallet is utilized for the support with side directed rollers and drive mechanisms for moving the container from the transporter to a loading surface.

It is a further object of this invention to provide a cargo container handling system suitable for use with airborne cargo containers and including a low profile transporter vehicle which has mounted on it a roller bed of both gravity rollers and motorized friction drive wheels which provide for the sideways transfer of a cargo container from and to said roller bed, said roller bed being height adjustable and also including a cargo stand made to cooperate with the roller bed and be mounted on it and having legs by which the stand can support itself on the ground, said legs being of a length sufficient to allow the transporter to drive from beneath the stand when the roller bed is lowered enough to clear the underside of the stand, and further including a cargo pallet which attaches to the top of the cargo stand and can also be attached to the bottom of an airborne cargo container, said pallet being constructed of a lattice design of cross-bars and slots allowing the rollers and drive wheels of the roller bed to protrude upward through the slots to engage the underside of the cargo container providing a means of moving the container and also providing multiple contact support areas for the underside of said cargo container.

It is yet another object of this invention to provide a cargo container handling system which is adaptable for use with both airborne type and surface borne type cargo handling equipment.

SUMMARY OF THE INVENTION

In accordance with the principles of this invention, a system of handling airborne cargo containers is provided. The system utilizes three main elements: a motorized, low-profile vehicle with a height-adjustable motorized roller bed mounted thereon; a stand which mounts on the roller bed and which has legs that touch the ground when the roller bed is lowered; and a slave pallet which is attachable to the underside of an airborne cargo container and which mounts on the stand and has a lattice structure that allows the rollers of the transporter bed to protrude through the pallet and engage the bottom of the cargo container.

The roller bed of the transporter is mounted on means to raise and lower the bed such as hydraulic lifting cylinders, one at each corner. The hydraulic cylinders are operable in pairs along any side to make the platform adjustable in roll and pitch as well as in height to allow alignment of the bed with prior art cargo handlers and to allow leveling of the bed in the event the transporter is on uneven terrain. The bed consists of both gravity rollers and motor driven friction wheels to move the container over the pallet.

The stand is mounted on top of the roller bed and is positioned by means of two positioning cones, one on each end of the roller bed, which engage conical apertures in the underside of each end of the stand. The stand has legs that extend downwardly and which touch the ground when the roller bed is lowered. Upon sufficient lowering, the roller bed clears the underside of the stand, and the transporter can be driven out from underneath the stand.

The slave pallet mounts on the stand and preferably has standardized container corner mounted recesses which cooperate with standardized container pivot connectors on each corner of the upper surface of the stand. The pallet consists of a frame and a lattice or grid arrangement of cross pieces which allow the rollers of the transporter roller bed to protrude up through the pallet lattice and extend past the top of the lattice.

There are two apertures in one side of the pallet extending laterally through to the other side of the pallet. These apertures are of sufficient size to allow the insertion of the forks of a common cargo handling vehicle, such as a forklift, thus enabling the pallet alone or the pallet and container together to be moved by forklift when placing the cargo on a surface vehicle, for example, a highway trailer or flatbed rail car.

In the process of unloading an airplane according to the principles of the present invention, a transporter with stand and pallet mounted thereon is driven to a position beside a cargo unloading platform located adjacent the cargo door of an aircraft. The transporter stand and pallet assembly are brought into alignment with the side of the cargo unloading platform. A container is unloaded from the aircraft onto the loading platform and then transferred from the platform to the pallet. As the container is moved onto the pallet, the motor driven friction wheels of the transporter bed engage the bottom of the container through the pallet lattice and move the container sideways from the loading platform onto the pallet. The pallet is locked into position on the underside of the cargo container by means of hinged hooks on the pallet which engage slots in the sides of the container.

The transporter then transports the container to a cargo storage area where the roller bed is lowered sufficiently to allow the legs of the stand to touch the ground and the roller bed to be clear of the bottom of the stand. The transporter is then driven out from under the stand and continues on to pick up another stand and empty pallet to repeat the process of unloading a container from the plane. The stand carrying the pallet and container is now in a position to await further handling of the cargo.

Alternatively, the transporter can move the container to a loading area where the container and pallet can be removed from the transporter and stand and loaded onto the trailer bed of a highway carrier or onto a railroad car for surface transport.

From the foregoing, it can be seen that a cargo handling system is provided which enables airborne cargo containers to be transported from an airplane to a surface vehicle with a minimum of equipment and a minimum of time during which the transporter vehicle is not available for moving cargo. Also, a slave pallet is provided which does not require roller means and drive wheel means to be installed in the pallet itself, thus providing a lighter weight and less expensive pallet.

BRIEF DESCRIPTION OF THE DRAWINGS

The foregoing objects and many of the attendant advantages of the invention will become more readily appreciated as the same becomes better understood by reference to the following detailed description when taken in conjunction with the accompanying drawings, wherein:

FIG. 5 is a perspective view of the pallet of this invention;

FIG. 6 is a perspective view of a container positioned on the pallet of this invention;

FIG. 7A is a front elevational view of an aircraft using the invention;

FIG. 7B is a front elevational view of an aircraft showing the movement of a container onto the pallet, stand and transporter combination;

FIG. 7C is an end elevational view of the system showing the handling of a container with a forklift.

DESCRIPTION OF THE PREFERRED EMBODIMENT

Figure 1:
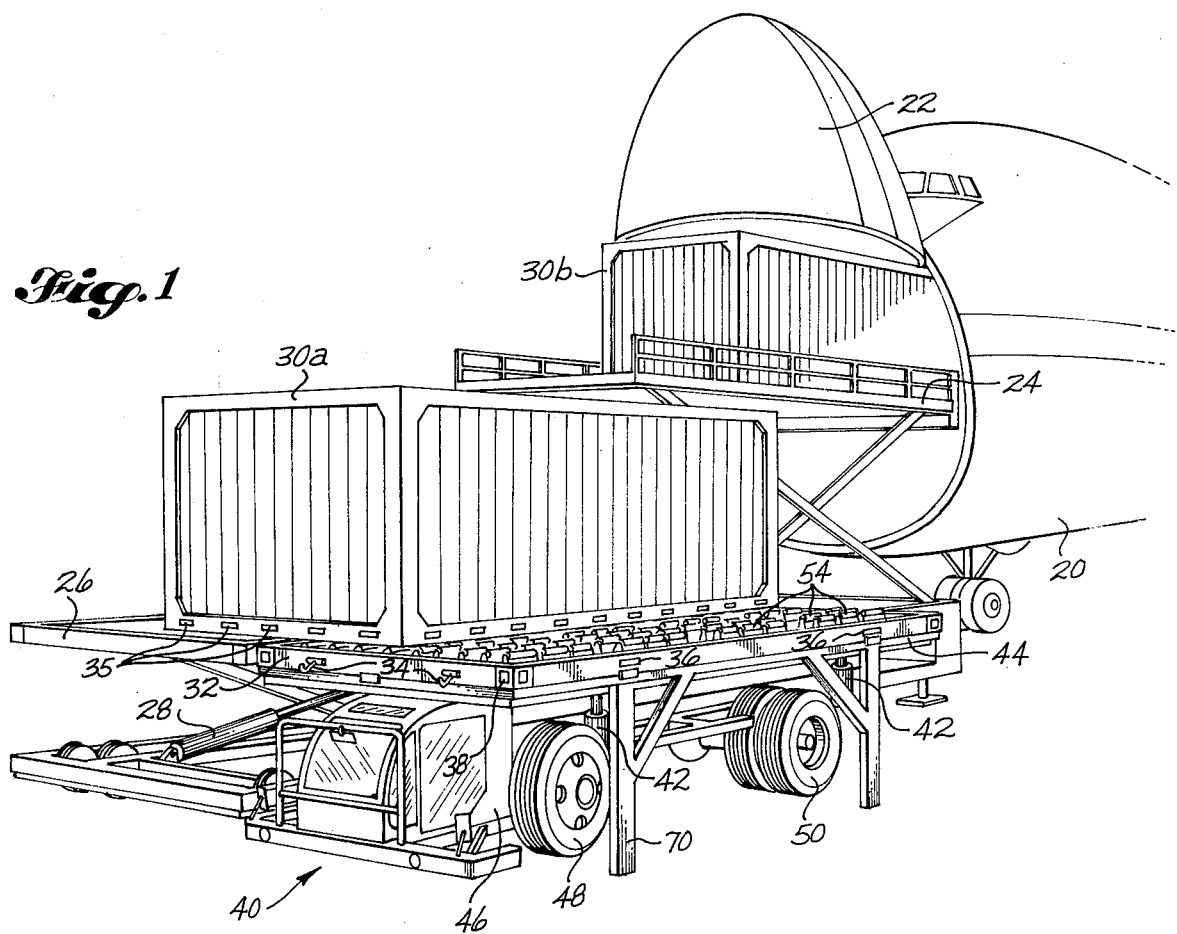
FIG. 1 is a general perspective view of the apparatus of this invention in use unloading a cargo container from an aircraft.

FIG. 1 shows the apparatus of this invention in use unloading a cargo container from the nose hatch of an aircraft. The container 30a is first moved from the cargo hatch of the aircraft onto a conventional container receiving platform 24 and then onto a conventional elevator platform 26. The elevator platform lowers the container until it is in alignment with the pallet 32 and rollers 54 of the invention. The container is then moved sideways from the elevator platform onto the rollers and pallet. The motorized friction wheels 56 engage the underside of the container, causing it to move onto the pallet.

Figure 2:
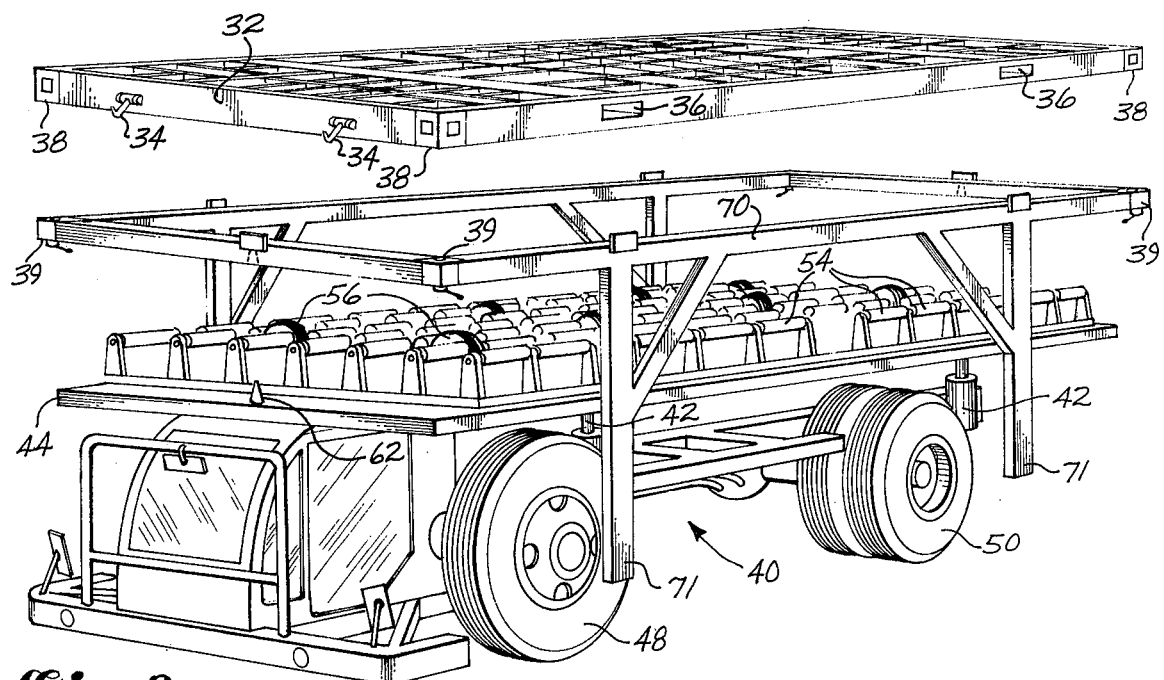
FIG. 2 is an exploded perspective view of the apparatus showing the three main elements of transporter, stand and pallet.
Figure 3:
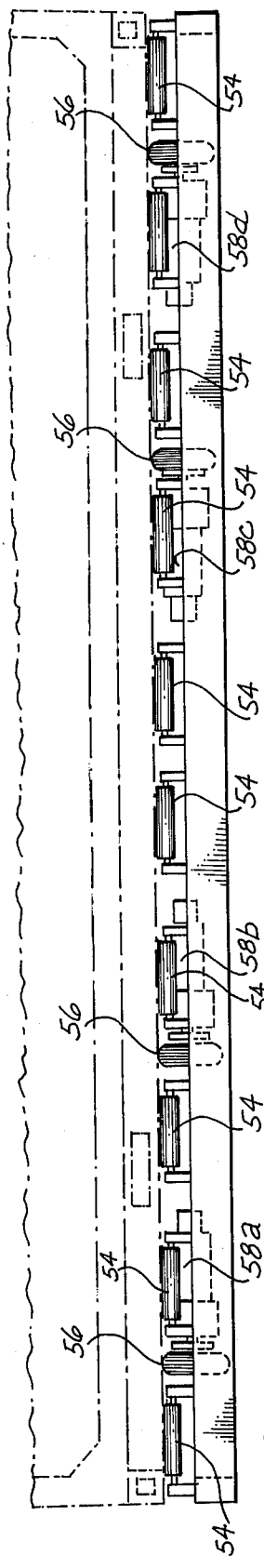
FIG. 3 is a partial side view of the container drive and support mechanism.

The apparatus of an embodiment of the invention is shown in FIG. 2. The transporter 40 is a low profile vehicle which is preferably self-propelled but may be a passive vehicle which is pushed or pulled into its desired position by a conventional self-propelled vehicle such as a tractor. Said transporter 40 has a pair of load-supporting steerable wheels 48 at the forward end of the frame by which its direction is controlled to bring it into its desired position. The rear wheels 50 are also load supporting and may be either drive wheels (in the case of a self-propelled vehicle) or non-driven (in the case of a passive vehicle).

Figure 4:
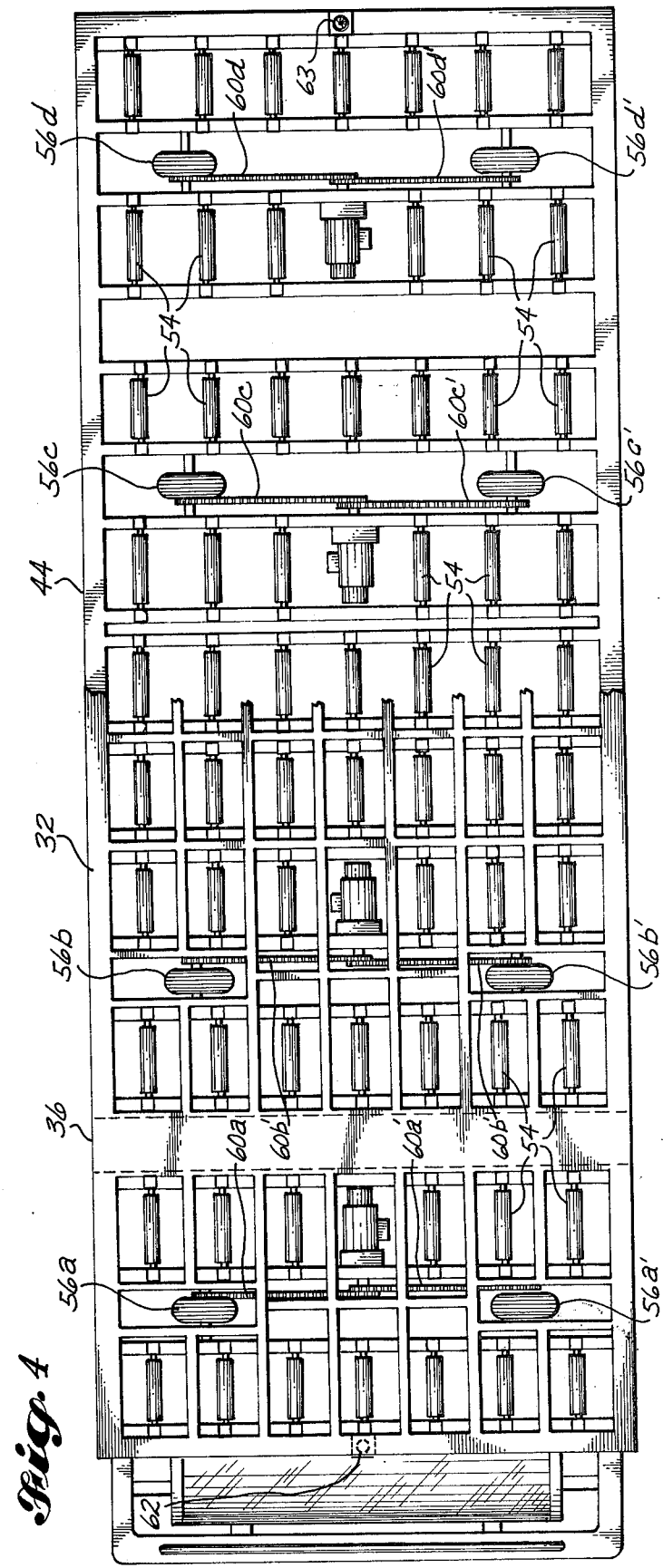
FIG. 4 is a plan view of a pallet mounted on the container drive and support mechanism with the pallet partially in phantom outline.

The transporter has mounted thereon a height-adjustable bed 44 consisting of gravity rollers 54 and motorized friction wheels 56. The motorized friction wheels 56 provide the means for moving the cargo container 30 onto and across the roller bed 44. The motorized friction wheels are preferably pneumatic rubber tires having tread around their perimeter sufficient to maintain friction with the underside of the cargo container to cause the container to move with the perimeter of said tire as the tire rotates, thus causing the container to move across the roller bed 44. The motorized friction wheels 56 of the preferred embodiment are driven by hydraulic motors 58 through drive belts 60 as best shown in FIG. 4. However, other motor means could be used for example electrical motors and the drive could be direct from the motor or by means of gears or chains.

The bed 44 is mounted on lifting devices, for example hydraulic jacks 42, one at each corner, which provide the height adjustability feature of the bed. Further, the jacks are operable in pairs along each side or at the front and back of the low profile motorized vehicle so that the bed is also adjustable in roll and pitch to provide for alignment with conventional container handling equipment. The roll and pitch adjustability of the bed is desirable in that the bed and cargo mounted thereon can be kept level in the event that the surface of the cargo loading area is such that the transporter vehicle cannot be kept level, for example in the case of broken or potholed concrete on asphalt pavement or because of the absence of pavement on a dirt surfaced cargo loading area. It is desirable to have the lifting devices operable in pairs along each side or end of the bed to prevent racking of the bed.

The stand 70 is a rectangular frame which has four legs 71 extending downwardly near each corner. Said legs can be of fixed length or they may be telescoping so that in the event of rough terrain to be crossed during transfer they can be independently adjusted in length to provide ground clearance or in the event of an uneven surface at the cargo staging area on which the stand must rest the legs can be adjusted to level the stand and cargo container. The frame is about the same size as the roller bed 44 and rests on the bed surrounding the rollers 54. The roller bed has a front indexing cone 62 and a rear indexing cone 63 extending upwardly at each end of the roller bed, which cones engage conical apertures in the front and rear of the underside of the frame of stand 70 to provide a means of properly positioning the stand on the roller bed and preventing translation thereof on the bed during transport of containers.

The pallet 32 is a rectangular frame which fits on the stand 70. The interior of the frame is filled by a lattice structure. The lattice is formed by crossbars running laterally from side to side and longitudinally from end to end in the interior of the frame forming slots through which the roller 54 and friction drive wheels 56 of the roller bed 44 can protrude when the pallet 32 is mounted on the roller bed. The rollers and motorized friction wheels extend upwardly a distance greater than the height of the pallet 32 to enable them to engage the underside of the container 30.

In the illustrated embodiment, the rollers 54 and motorized friction wheels 56 are mounted in fixed relation to the bed 44 so that the said rollers and friction wheels constantly protrude through the lattice of pallet 32 providing a multiple contact area support for the container 30 during transport. Alternatively the rollers and friction wheels could be retractably mounted on the bed so that after the container was completely positioned on the pallet, the rollers and wheels could retract from their protruding position, allowing the container to rest on the pallet with the pallet being the sole source of multiple contact area support for the underside of the container.

Preferably the pallet 32 has standardized container corner mounted recesses 38 on each corner. These cooperate with standardized container pivot connectors 39 mounted on the corners of stand 70 to temporarily couple the pallet and stand. In order to temporarily fasten the pallet 32 to the underside of the cargo container 30, the pallet has a pair of hooks 34 attached at each end, said hooks being hinged at the point where they are attached to the pallet to enable them to move in a vertical plane, normal to the end of the pallet. The hooks 34 coact with slots 35 located at the base of the cargo container 30 so that when said container is mounted on said pallet the hooks can be engaged in the slots to prevent the movement of the container in relation to the pallet. This is best illustrated in FIG. 6.

In order to accomodate surface borne cargo handling equipment, for example, forklifts, the pallet has two apertures 36 in the side of the frame which extend laterally through the lattice and are of a size sufficient to accept the forks of a conventional forklift. The forklift apertures 36 are positioned such that the forks of the forklift when engaging the apertures do not interfere with the rollers 54 and motorized friction wheels 56 or the friction wheel motors 58 of the roller bed 44. This can best be seen in FIG. 4.

A typical sequence of operation of the cargo handling system of the present invention is shown in FIGS. 7A through 7C. An airborne cargo container 30b is moved out of the fuselage 20 of an aircraft, across a container receiving platform 24 and onto an elevator platform 26 in a conventional manner. The elevator platform is then lowered into side-by-side alignment with the transporter 40a of this invention which has been driven into position with a stand 70a and pallet 32a mounted on the roller bed 44a. The container is moved sideways towards the roller bed 44a and when the container is sufficiently over the pallet 32a, the motorized friction wheels 56 of the roller bed engage the underside of the container causing the container to continue across the pallet until the container is completely on the pallet. The pallet is then secured to the container by means of hinged hooks 34 which engage slots on the ends of the container. The container is now ready to be transferred to a cargo loading area.

Once at the cargo loading area, the roller bed 44 is lowered to allow the legs 71 of stand 70a to touch the ground. The container 30a and pallet 32a are then supported by stand 70a and the transporter is driven out from under the container. This frees the transporter to return to a staging area to pick up another stand and pallet assembly and return to the aircraft to offload another container, or alternatively the transporter could pick up a stand and pallet carrying a container to be reloaded onto the aircraft.

The container 30c which was offloaded from the aircraft is now in a position to be placed on a surface borne cargo vehicle. In FIG. 7, container 30c and pallet 32c are shown being lifted from the stand 70c by a forklift 72. The pallet 32c provides the needed rigidity to the airborne container to allow handling by surface-type cargo handlers. Also in FIG. 8c is shown a container 30d which has been placed on the bed 74 of a highway trailer. Preferably, the trailer is equipped with standardized container pivot connectors 39 to cooperate with standardized container corner mounted recesses 38 on the pallet 32d and thereby fasten the container and pallet to the trailer bed.

Alternatively, the container could be loaded onto a railway car or if the distance from the aircraft to the destination of the cargo was short, the container could be directly transported to its destination by transporter 40.

It will be appreciated from the foregoing that the pallet 32 remains with the container 30 from the time the container is offloaded from the plane until such time as it is onloaded again. It will also be appreciated that since the rollers and motorized friction wheels are a part of the transporter the pallets of this invention are lighter in weight and less expensive to manufacture than the prior art pallets which contain the roller mechanism within themselves. Also, since there are roller beds only in the transporter, the number of roller beds needed in the system is reduced. Investment and maintenance costs are thereby decreased.

The procedure for onloading containers is the reverse of the offloading procedure. A surface carrier such as a highway trailer or railway car delivers the container and pallet assembly to the cargo receiving area. Conventional surface borne cargo handling equipment is used to remove the container and pallet from the surface carrier and place it on an empty, free-standing stand 70. An empty transporter is driven under the stand and the roller bed raised sufficiently to engage and raise the container, pallet and stand to allow the legs of the stand to clear the ground. Alternatively, the conventional surface borne cargo handling equipment may be used to deposit the container and pallet directly upon the transporter. The transporter with the container, pallet and stand assembly mounted thereon is then driven to the aircraft. The transporter is positioned so that it is side-by-side with a conventional elevator platform. The elevator platform height is aligned with the pallet and the hinged hooks 34 are released. The motorized friction wheels 56 move the container sideways off the pallet and onto the elevator platform. When the container is on the elevator platform, the platform height is brought into alignment with the container receiving platform 24 and the container moves by conventional means from the elevator platform onto the container receiving platform to await onloading onto the aircraft cargo deck.

The transporter is now free to be driven to a staging area where it can leave the empty pallet and stand and return to the cargo receiving area to pick up another container to be onloaded.

It will be appreciated that a system and apparatus for handling lightweight cargo containers such as those used in airborne cargo shipment is provided. The apparatus illustrated comprises: a low profile vehicle which has mounted on it a height-adjustable motorized roller bed, said bed containing both rollers and motorized friction wheels to provide for the sideways movement of cargo containers on to and off of said bed; a cargo stand which cooperates with said roller bed and which has legs of length sufficient to touch the ground when the roller bed is lowered so that the cargo stand becomes freestanding; a cargo pallet which mounts on the cargo stand and which attaches to the underside of an airborne container to provide the rigidity to the container necessary to adapt airborne cargo containers to handling by surface borne cargo handling equipment, such as forklifts and cranes and which pallet has slots in it to allow the rollers and friction wheels of the roller bed to protrude through the pallet and engage the underside of the cargo container thereby providing a means of moving the container on and off the pallet.

While a preferred embodiment of the system and apparatus of the invention has been illustrated and described, it will be appreciated by those skilled in the art and others that various changes can be made therein without departing from the spirit and scope of the invention.

The embodiments of the invention in which an exclusive property or privilege is claimed are defined as follows:

1. Apparatus for handling lightweight cargo containers comprising:
    a low profile transporter adapted to receive a cargo container on an upper platform surface thereof, said transporter comprising a frame, a pair of steerable load supporting wheels positioned at the forward end of said frame and a pair of load supporting wheels positioned at the rearward end of said frame, said frame carrying a vertically movable support surface adapted to engage said cargo container, said vertically movable support surface including a side directed roller and drive wheel mechanism for sideways loading and unloading of said cargo container;
    a cargo container stand having legs depending from a frame, said frame adapted to rest on said vertically movable support surface and having transporter engaging indexing means to prevent movement of said stand with respect to said transporter when said stand rests upon said support surface;
    a cargo pallet adapted to receive said cargo container on the upper surface thereof and having apertures therethrough to receive said roller and drive wheel mechanism, said apertures permitting said roller and drive wheel mechanism to protrude through said pallet into engagement with said cargo container when said pallet and said stand rest upon said transporter, said pallet providing subjacent support to said container to prevent damage thereto during handling; and,
    means to latch said pallet to said container to prevent relative motion between said pallet and said container.

2. The apparatus of claim 1 wherein said support surface is retractable downwardly permitting said legs to engage the ground to allow said drive wheel and roller mechanism to clear the bottom-most portion of said stand to permit said transporter to drive from beneath said stand.

3. The apparatus of claim 1 wherein said vertically movable support surface is rectangular and further wherein said vertically movable support surface is mounted on hydraulic jacks, one located at each corner of said vertically movable support surface.

4. The apparatus of claim 3 wherein said hydraulic jacks are operable in pairs along each side of said vertically movable support surface so as to provide roll and pitch adjustment of the vertically movable suppport surface.

5. The apparatus of claim 1 wherein said cargo pallet is rectangular in shape and has standardized container corner mounted recesses located at each corner of said pallet and further wherein the frame of said stand is rectangular in shape and has standardized cargo container pivot connectors located at each corner of said frame to coact with said corner mounted recesses of said cargo pallet.

6. The apparatus of claim 4 wherein said cargo pallet is rectangular in shape and has standardized container corner mounted recesses located at each corner of said pallet and further wherein said frame of said stand has standardized cargo container pivot connectors, one located at each corner of said frame to coact with said corner mounted recesses of said cargo pallet.

7. The apparatus of claim 1 wherein said cargo pallet has at least two apertures located in one side of pallet and extending laterally through said pallet to the opposite side of said pallet.

8. The apparatus of claim 5 wherein said cargo pallet has at least two apertures located in one side of said pallet which extend laterally through said pallet to the opposite side of said pallet.

9. The apparatus of claim 1 wherein said roller and drive wheel mechanism comprises at least four rubber wheels drivingly connected by belts to at least two hydraulic motors.

10. The apparatus of claim 2 wherein said roller and drive wheel mechanism comprises at least four rubber wheels drivingly connected by belts to at least two hydraulic motors.

11. The apparatus of claim 5 wherein said roller and drive wheel mechanism comprises at least four rubber wheels drivingly connected by belts to at least two hydraulic motors.

12. The apparatus of claim 1 wherein said legs of said cargo container stand are non-telescoping.

13. Apparatus for handling lightweight cargo containers comprising:

a low profile transporter vehicle adapted to receive a cargo container on an upper surface thereof, said transporter comprising a frame, a pair of load supporting steerable wheels positioned at the forward end of said frame and a pair of load supporting wheels positioned at the rear end of said frame, said frame carrying a rectangular platform, said platform being mounted on hydraulic jacks, one of said jacks supporting each corner of said rectangular frame, said jacks being operable in unison to raise and lower said rectangular platform and also being operable in pairs along each side or each end of said rectangular platform to provide roll and pitch adjustment of said rectangular platform, said rectangular platform having mounted thereon a side directed roller and drive wheel mechanism for the sideways loading and unloading of said cargo container, said roller and drive wheel mechanism comprising a plurality of gravity rollers cylindrical in shape and mounted in rows laterally across said rectangular platform with said rollers positioned so that their longitudinal axes are parallel to the fore-aft axis of said transporter vehicle, said roller and drive wheel mechanism further comprising a plurality of pneumatic rubber tires mounted on said platform, positioned in pairs among said rollers, and having their axes or rotation parallel to the fore-aft axis of said transporter vehicle, each pair of said pneumatic rubber tires drivingly connected by belts to a hydraulic motor mounted on said rectangular platform;

a cargo container stand having legs depending from a frame, said frame being of rectangular shape and adapted to rest on said rectangular platform, said frame having conical apertures located on the underside of said frame which cooperate with indexing cones projecting from and normal to the upper surface of said rectangular platform to properly position said cargo container stand on said rectangular platform and to prevent movement of said stand with respect to said rectangular platform when said stand rests on said rectangular platform, said legs of said stand being of sufficient length to touch the ground when said rectangular platform is lowered, said rectangular platform capable of being lowered sufficiently to enable the uppermost portion of said roller and drive wheel mechanism to clear the bottom-most portion of said container stand frame, permitting said transporter to be removed from beneath said stand;

a cargo pallet adapted to receive said cargo container on the upper surface thereof, said pallet being rectangular in shape and comprising a frame and a lattice within said frame, said lattice comprising cross-bars running laterally and longitudinally within said frame, and forming right angles at their intersections so that said lattice contains a plurality fo rectangular apertures, said apertures positioned to cooperate with said rollers and pneumatic rubber tires of said roller and drive wheel mechanism to allow said rollers and tires to protrude through said pallet apertures a distance above said pallet upper surface into engagement with the underside of said cargo container when said container is mounted on said pallet and said pallet is resting on said transporter vehicle, said pallet having standarized container corner mounted recesses located at each corner of said pallet, and said stand having standardized container pivot connectors located at each corner of said stand to coact with said corner mounted recesses to prevent relative motion between said pallet and said stand, wherein further said pallet has a pair of hooks attached to the exterior of each end of said frame of said pallet, said hooks being hinged at the point at which they are attached to said pallet and being able to move in a vertical plane normal to said pallet, said hooks coacting with slots located on the exterior of the lower protion of the ends of said cargo container to prevent relative motion between said container and said pallet when said container rests on said pallet, and wherein further said pallet has at least two rectangular apertures located in one side of said pallet and extending laterally through to the opposite side of said pallet, said apertures being of size sufficient to accept the forks of a conventional forklift.

* * * * *